United States Patent [19]

Himmel

[11] Patent Number: 5,007,570

[45] Date of Patent: Apr. 16, 1991

[54] LUGGAGE RACK FOR A VEHICLE

[75] Inventor: Francis Himmel, Sterling Heights, Mich.

[73] Assignee: Chrysler Corporation, Highland Park, Mich.

[21] Appl. No.: 502,952

[22] Filed: Apr. 2, 1990

[51] Int. Cl.⁵ .............................................. B60R 9/04
[52] U.S. Cl. ................................... 224/321; 224/326
[58] Field of Search ............. 224/321, 325, 326, 309

[56] References Cited

U.S. PATENT DOCUMENTS 4,406,386  9/1983  Rasor et al. ........................ 224/321

*Primary Examiner*—Linda J. Sholl

*Attorney, Agent, or Firm*—Edward A. Craig

[57] ABSTRACT

A luggage rack is provided for mounting on the roof of a vehicle. The luggage rack includes a pair of elongated side rails securable to the roof. A slot is provided in each slide rail to receive the tongue of a stanchion. A detachable cross member extends between stanchions provided on each side rail. The stanchions permit slidable adjustment of the cross member along the length of the side rails. A spring urged locking pin is provided in each stanchion. The pins project out of the stanchions into pockets provided in the side rails to lock the stanchions in an adjusted position. The locking pins are retractable to permit sliding of the stanchions to different adjusted positions.

4 Claims, 4 Drawing Sheets

LUGGAGE RACK FOR A VEHICLE

BACKGROUND OF THE INVENTION

1. Field of the Invention

This invention relates to a luggage rack for a vehicle including side rails with a cross member extending therebetween. The cross member is slidable to various adjusted positions and then locked in place.

2. Description of Related Art

Luggage racks have long been popular accessory items for the roofs of vehicles. Luggage racks are useful for transporting various articles on top of a vehicle thereby enlarging the capacity of the vehicle which would otherwise be restricted to the vehicle interior and vehicle trunk. Luggage racks are particularly useful for vacation travel and also for carrying large articles such as lumber and the like.

It has been desired to simplify the construction of luggage racks. Conventionally, luggage racks have been made of side rails which are secured to the vehicle roof. Cross members have extended between the side rails to form a box-like structure to surround articles carried on the vehicle roof. Typically, tie-down ropes have been used to secure a load in place. The tie-down ropes have been secured to the side rails and cross members and extended across the load. Various tie-down loop structures have been provided in the past for both the side rails an cross members. Typically, the cross members and side rails have been made as a multi-piece structure requiring relatively expensive manufacture and installation procedures. Additionally, in many designs of the past, the cross members have not been movable along the side rails. It is desired that the cross members be movable along the side rails so that they may conform to the specific size of the load being carried and be locked in place after being moved to an adjusted position.

The present invention provides a desired construction which has a minimal number of parts thereby reducing installation costs and also the cost of manufacture. The luggage rack also has a desired curved aerodynamic design to conform with current tastes in vehicle styling.

SUMMARY OF THE INVENTION

Locking pins means are provided for a luggage rack of the type mounted on the roof of a vehicle. The luggage rack comprises a pair of elongated side rails. Each side rail is securable to the roof of a vehicle adjacent to one side of the vehicle and extends fore and aft of the vehicle. Each side rail has an elongated slot therein. A pair of stanchions are provided. Each stanchion has a tongue. The tongue of each stanchion is receivable in an elongated slot of a side rail and slidable therealong. A cross member extends between the stanchions.

Locking pin means are provided on each stanchion. The stanchions have a hollow interior. A locking pin is provided within the hollow interior of each stanchion. The stanchion has an opening extending from the exterior thereof to the hollow interior. The locking pin slidably extends through the opening. Spring means urge the locking pin in a direction to project out from the stanchion. Manually engagable locking pin retraction means are attached to the locking pin for drawing the locking pin against the force of the spring means into the stanchion. Each side rail has a plurality of spaced apart pockets along the length thereof adjacent to the elongated slot. Each locking pin is receivable in a pocket of a side rail to maintain the stanchions in a fixed position. The locking pins are retractable out of the pockets by the locking pin retraction means to permit sliding of the stanchions in the elongated slots to different adjusted positions.

A wall is provided in the hollow interior of each stanchion. The wall has an opening therein through which the locking pin slidably projects. The manually engagable locking pin retraction means includes a slide button on the exterior of the stanchion. The stanchion has a slot therethrough positioned under the slide button. A lever extends from the slide button through the slot into the stanchion hollow interior. Means are provided to pivotably connect the lever to the locking pin whereby movement of the slide button in one direction causes retraction of the locking pin and movement of the slide button in the other direction causes extension of the locking pin.

A guide pin extends from the lever. The guide pin is positioned within the hollow interior of the stanchion. The wall in the hollow interior has a second opening therein through which the guide pin slidably projects. The guide pin prevents undue pivoting of the lever with respect to the locking pin. The openings through which the locking pin and guide pin project have a slightly larger diameter than the pins to permit limited pivoting of the pins to prevent the pins jamming in one position.

IN THE DRAWINGS

DETAIL DESCRIPTION OF A PREFERRED EMBODIMENT

Figure 1:
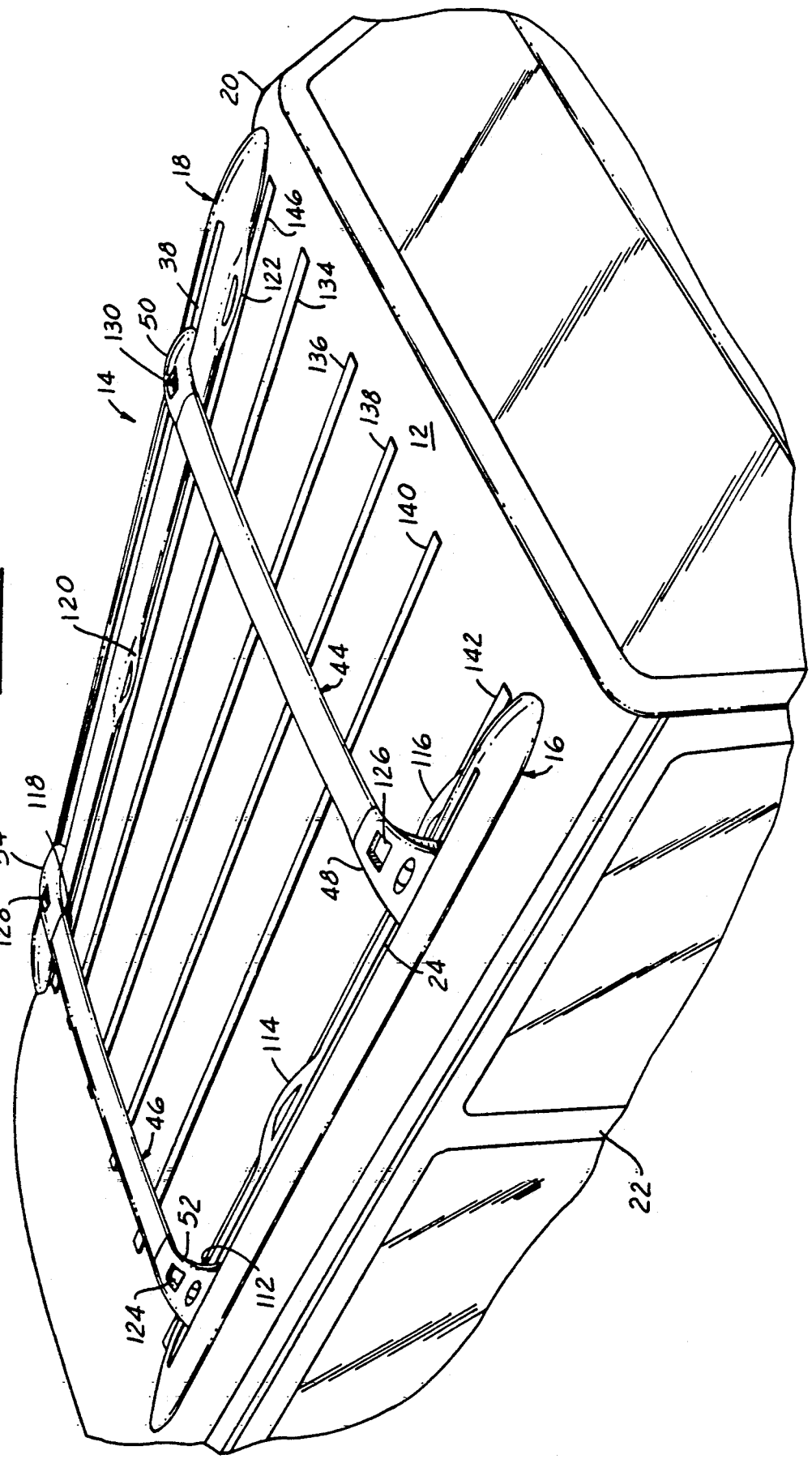
FIG. 1 is a view in perspective of a vehicle with the luggage rack forming one embodiment of the present invention illustratively mounted on the roof thereof.
Figure 2:
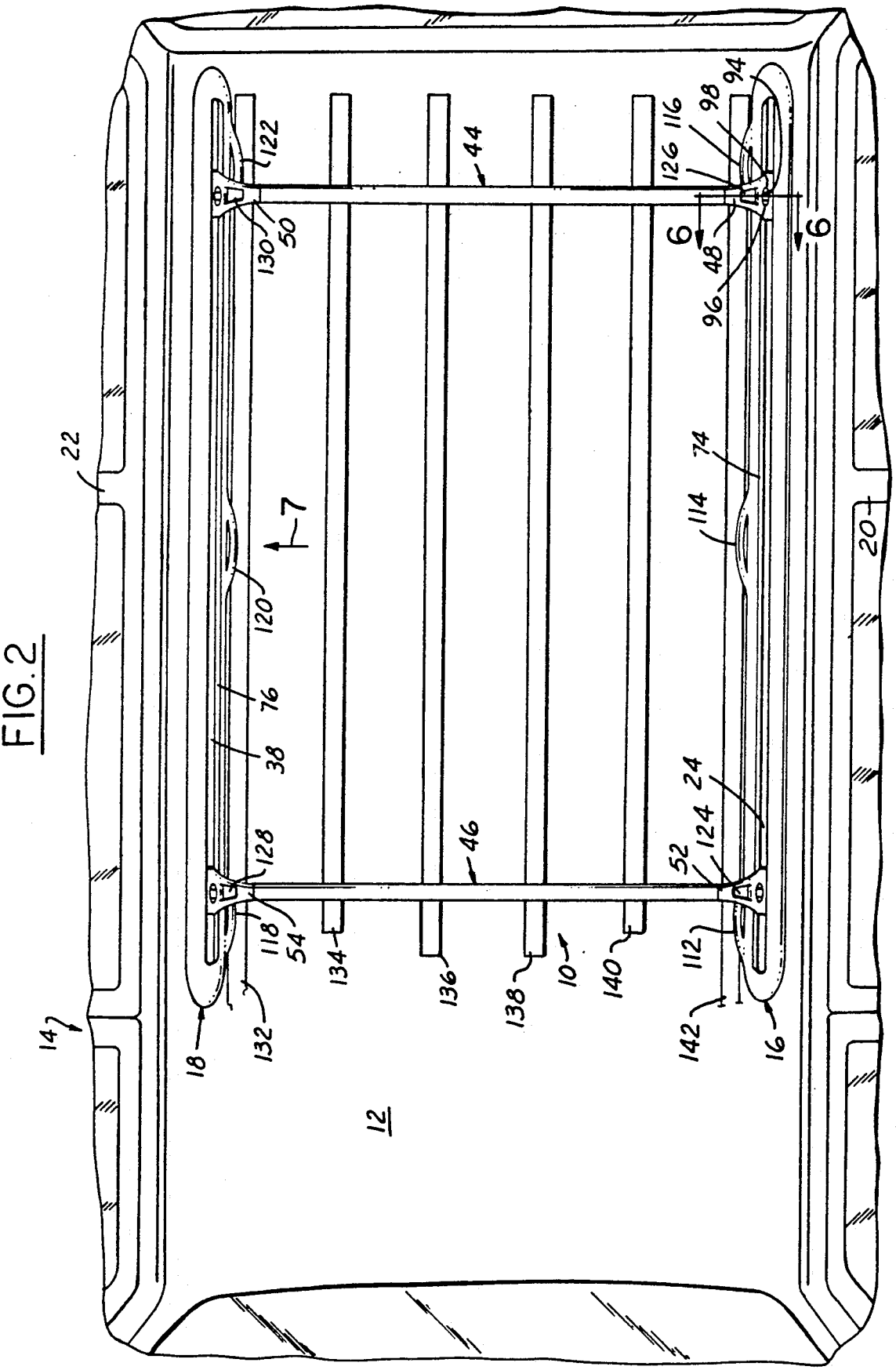
FIG. 2 is a top plan view of the vehicle of FIG. 1.
Figure 3:
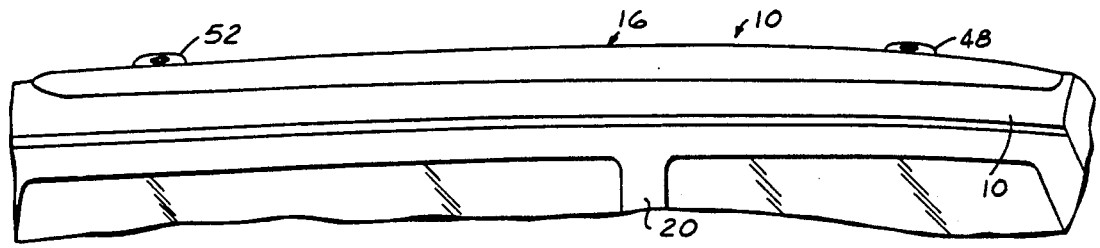
FIG. 3 is a side elevational view of the upper portion of the vehicle of FIG. 1.

Referring to FIGS. 1-3, it will be noted that the luggage rack 10 of the present invention is mounted on the roof 12 of a vehicle 14, the vehicle being illustratively a minivan. The luggage rack 10 includes a pair of elongated side rails 16, 18. Each side rail 16, 18 is secured to the roof 12 of the vehicle 14 adjacent to one side 20, 22 of the vehicle 14 and extending fore and aft of the vehicle.

Figure 6:
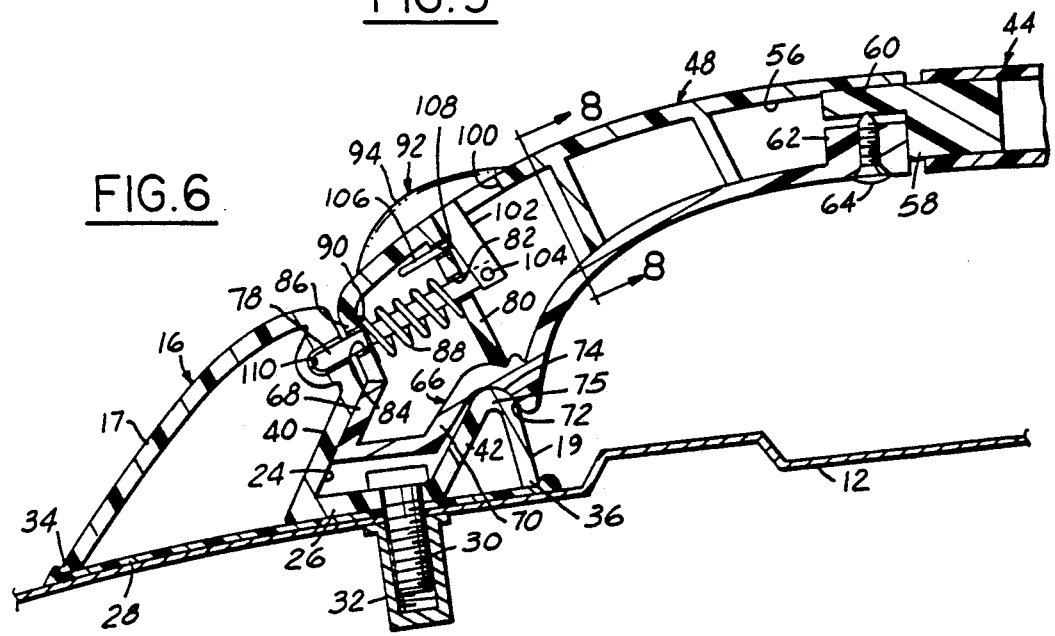
FIG. 6 is a sectional view taken substantially along the line 6—6 of FIG. 2 looking in the direction of the arrows.

The means for securing the side rails in place are best illustrated in FIG. 6. As will be therein noted, the side rail 16 includes an elongated slot 24 having a bottom wall 26. The side rail 16, which includes an outer wall 17 and an inner wall 19, is mounted on an elongated pad 28 which is interposed between the side rail and the roof 12. Opening means extend through the bottom wall 26 and pad 28 as well as through the roof 12. An externally threaded member 30 extends through the opening means and into threaded engagement with an internally threaded member 32 to thereby fixedly secure the side rail in place. A plurality of such threaded members are provided along the length of each side rail 16, 18 to maintain the side rails in place.

Each side rail has an outer edge 34 and an inner edge 36. The elongated slot 24 is formed between the outer edge and inner edges. The side rail 18 is also provided with an elongated slot 38. The elongated slots terminate short of the ends of the side rails. Conventionally, a separate end piece is provided at one end of each side rail in order to permit mounting of the stanchions of cross members as will be later described. In accordance with the present invention, it is not necessary to provide such a separate end piece for the side rails.

Referring again to FIG. 6, it will be noted that the elongated slots each include a pair of substantially parallel spaced apart side walls 40, 42 which are interconnected by the bottom wall 26. The side walls are angled towards the outer edges 34 of the side rails. However, the side rails could also be angled towards the inner edges in accordance with the present invention. The purpose of this angulation is to prevent removal of the stanchions as will later become apparent.

Illustratively, the luggage rack 10 is provided with a pair of cross members 44, 46. Each cross member is slidably secured to the side rails by means of stanchions 48, 50 and 52, 54. The stanchions are detachably secured to the cross members after the stanchions are mounted on the side rails. As shown in FIG. 6, each stanchion has a hollow neck portion 56. The cross members, which are also hollow, have a plug 58 in each end thereof. The plug 58 has a projecting portion 60 which is received within the neck 56. An enlarged portion 62 is provided adjacent the opening to the neck 56. A set screw 64 is threaded through an opening in enlarged portion 62 into engagement with portion 60 to thereby detachably secure the cross member to the stanchion.

Figure 4:
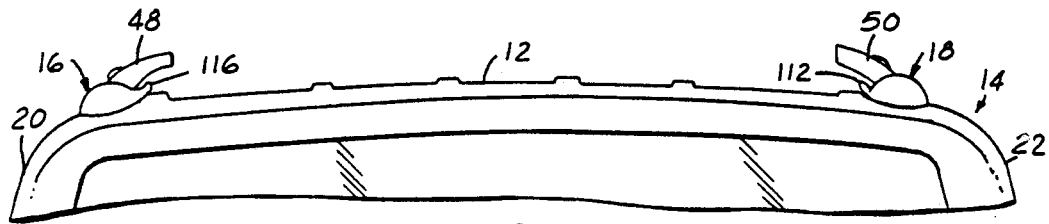
FIG. 4 is a rear elevational view of the vehicle of FIG. 1 with the cross member stanchions mounted in place, but with the cross member removed.
Figure 5:
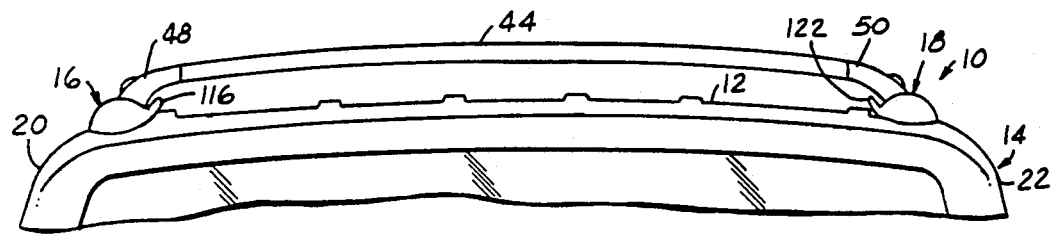
FIG. 5 is a view similar to FIG. 4 with the cross member secured between the stanchions.

Again as shown in FIG. 6, each stanchion has a tongue 66 which is received within an elongated slot of the side rail. Each tongue includes an outer side wall 68 and an inner side wall 70. These side walls are substantially parallel to each other. The side walls of each stanchion are angled in the same direction as the side walls of the elongated slots 24, 38 of the side rails 16, 18. The tongue side walls 68, 70 are spaced apart a distance resulting in the tongue defined thereby being slightly less in width than the width of the elongated slot of a side rail. The tongue of each stanchion is receivable in an elongated slot 24, 38 of a side rail 16, 18 and is slidable therealong. As previously discussed, after the stanchions 48, 50 and 52, 54 are mounted on the side rails 16, 18 as shown in FIG. 4, the cross members 44, 46 are detachably secured thereto to complete the assembly as shown in FIG. 5. The angulation of the stanchion tongues and elongated slots thereafter prevent removal of the stanchions from the side rails. Thus, it is not necessary to have an end opening in the side rails to receive the stanchion tongues as has been common in the past. This eliminates the need for a separate end piece on each side rail.

Each stanchion has a groove 72 on the underside thereof adjacent to the tongue inner side wall 70. The groove 72 extends for the longitudinal length of the stanchion. Each side rail has an elongated slide 74, 76 extending for the length of the elongated slot 24, 38 between the elongated slot and inner edge of the side rail 16, 18. The slides are defined by a web 75 which extends between the side rail inner wall 19 and the slot inner wall 42. The elongated slides 74, 76 of each side rail are received in the groove of a stanchion mounted thereon to support the stanchion for sliding movement along the side rail.

Each stanchion is substantially a hollow member. A locking pin 78 is provided within each stanchion. An interior wall 80 is provided within each stanchion for slidably mounting the locking pin 78. The wall 80 is provided with an opening 82 through which the locking pin 78 extends. A second opening 84 is provided in the stanchion wall portion 86. The locking pin 78 also extends through this opening to thereby securely mount the locking pin for sliding movement. A coil spring 88 is provided on the locking pin 78 between the wall 80 and a washer 90 which is fixed to the pin 78. The spring urges the locking pin 78 in a direction to project out from the stanchion through the opening 84.

Figure 9:
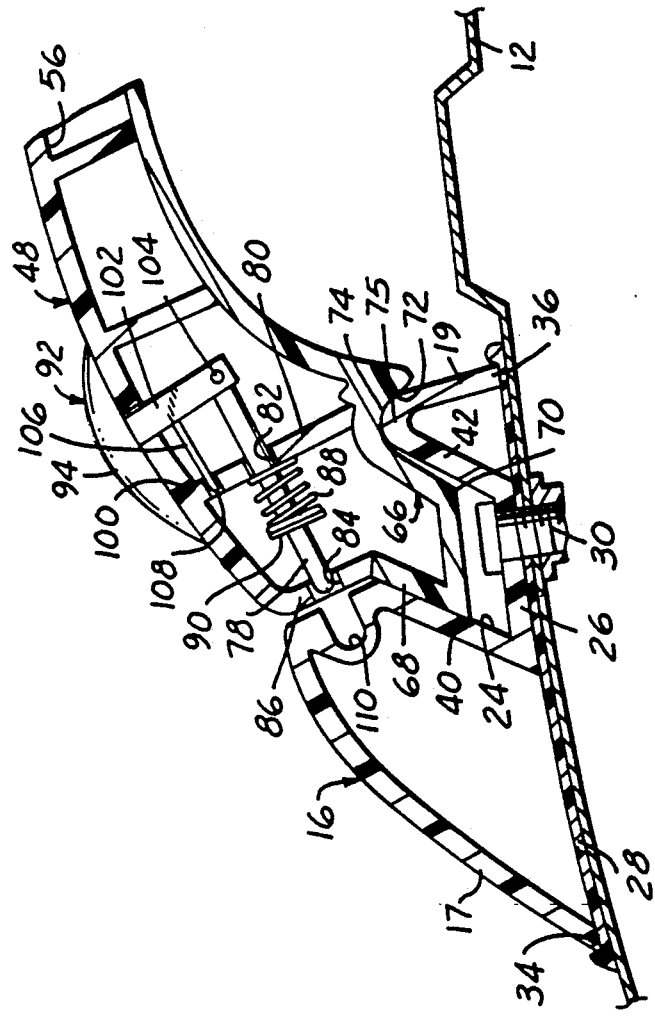
FIG. 9 is a view similar to FIG. 6 illustrating the stanchion locking pin in an extended position to fix the stanchion in place.

Manually engagable locking pin retraction means 92 are attached to the locking pin 78 for drawing the locking pin against the force of the spring 88 into the stanchion. The retraction means 92 comprise a slide button 94 provided on the exterior of the stanchion. The slide button is guided between a pair of guide members 96, 98 as may be seen in FIG. 2. A slot 100 is provided in the stanchion. A lever 102 extends from the button 94 through the slot 100 into the interior of the stanchion. The lever 102 is pivotally connected to the locking pin 78 by means of a pin 104. Thus, thumb actuation against the button 94 is effective to retract the locking pin 78 as illustrated in FIG. 9.

Figure 8:
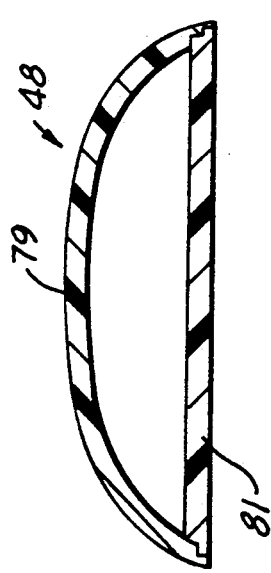
FIG. 8 is a sectional view taken substantially along the line 8—8 of FIG. 6 looking in the direction of the arrows.

A small guide pin 106 extends from the lever 102 through a second opening 108 in the wall 80. The function of the guide pin 106 is to slide in the opening 108 and prevent undue pivoting of the lever 102 with respect to the locking pin 78. As will be appreciated, if the lever 102 were not restricted in such pivotal movement, it could . be moved back and forth without retracting the locking pin 78. However, limited pivoting of the pins 78, 106 is desired to prevent jamming or freezing of the pins in one position. Therefore, the openings 82, 84, 108 have a slightly larger diameter than the pins to permit limited pivoting of the pins. As will be noted in FIG. 8, the stanchions are fabricated of two parts, an upper portion 79 and a lower portion 81. The lower portion 81 is adhered to the upper portion 79 after the locking pin structure has been mounted within the stanchion.

Figure 7:
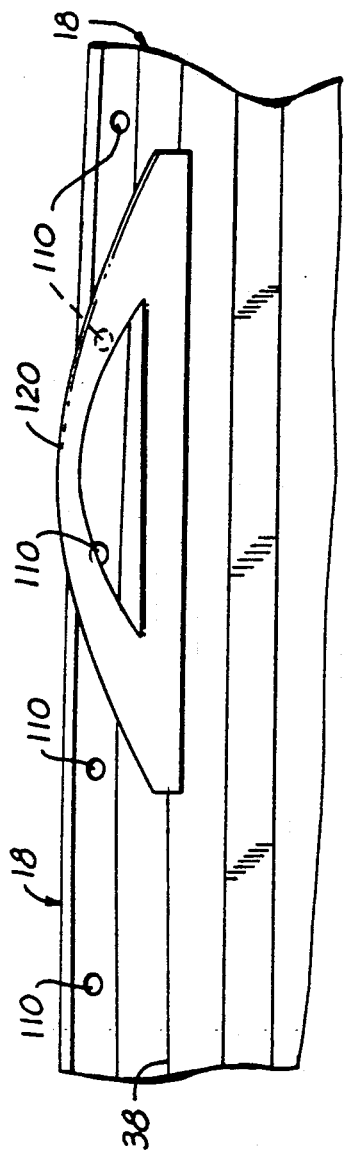
FIG. 7 is a view of a portion of a luggage rack side rail viewed in the direction of arrow 7 of FIG. 2.

As will be noted in FIG. 7, a plurality of spaced apart pockets 110 are provided along the length of each side rail adjacent to the elongated slots 24, 38. The pockets 110 receive the outer ends of the locking pins 78 to secure the side rails in various adjusted positions. In order to adjust the position of the stanchions and cross member extending therebetween, it is necessary to slide both of the buttons on the two stanchions to the position shown in FIG. 9 to cause retraction of the locking pins and move the cross member to a point where it is desired to secure a load. The buttons are then released and the stanchions are then moved back and forth a slight bit to cause the locking pins to find engagement with one of the pockets 110 as shown in FIG. 6. This firmly secures the cross member in the desired adjusted position.

Preferably, the side rails 16, 18 are formed of plastic by the injection molding technique. As will be noted in FIG. 2, three loops 112, 114, 116 and 118, 120, 122 are molded integrally on each side rail 16, 18. The loops extend inwardly of the vehicle. The function of the loops is to receive and secure a tie rope in place, the tie rope being passed over a load of articles on the roof 12. As is conventional, such tie ropes are used to crisscross the load and hold it in place. Additionally, an opening 124, 126, 128, 130 is provided in each stanchion. These openings extend entirely through the stanchions and also serve the function of being useful as securement points for tie-down ropes.

As will be noted in FIG. 6, the exterior surface of each side rail outer wall 17 is curved as is the adjacent portion of each stanchion outer surface as well as the adjacent portion of each cross member to form a continuous curved appearance. Such a curved appearance is desirable to give an aerodynamic effect which is currently popular from a styling point of view. The roof 12, which is fabricated of sheet metal, is a stamped part with longitudinally extending stamped out slats 132, 134, 136, 138, 140, 142 impressed therein. These slats serve as load supporting structure as is conventional.

I claim:

1. In a luggage rack for mounting on the roof of a vehicle, the luggage rack comprising a pair of elongated side rails, each side rail being securable to the roof of a vehicle adjacent to one side of the vehicle and extending fore and aft of the vehicle, each side rail having an elongated slot therein, a pair of stanchions, each stanchion having a tongue, the tongue of each stanchion being receivable in an elongated slot of a side rail and slidable therealong, a cross member extending between the stanchions, the improvement comprising each stanchion having a hollow interior, a locking pin within the hollow interior, the stanchion having an opening extending from the exterior thereof to the hollow interior, the locking pin slidably extending through said opening, spring means urging the locking pin in a direction to project out from the stanchion, manually engagable locking pin retraction means attached to the locking pin for drawing the locking pin against the force of the spring means into the stanchion, said manually engagable locking pin retraction means including a slide button on the exterior of the stanchion, the stanchion having a slot therethrough positioned under the slide button, a lever extending from the slide button through the slot into the stanchion hollow interior, and means pivotably connecting the lever to the locking pin whereby movement of the slide button in one direction causes retraction of the locking pin and movement of the slide button in the other direction causes extension of the locking pin, each side rail having a plurality of spaced apart pockets along the length thereof adjacent to the elongated slot, each locking pin being receivable in a pocket of a side rail to maintain the stanchions in a fixed position, the locking pins being retractable out of the pockets by the locking pin retraction means to permit sliding of the stanchions in the elongated slots to different adjusted positions.

2. A luggage rack as defined in claim 1, wherein a wall is provided in the hollow interior of each stanchion, the wall having an opening therein through which the locking pin slidably projects.

3. A luggage rack as defined in claim 1, wherein a guide pin extends from the lever, said guide pin being positioned within the hollow interior of the stanchion, said wall in the hollow interior having a second opening therein through which the guide pin slidably projects, the guide pin preventing undue pivoting of the lever with respect to the locking pin.

4. A luggage rack as defined in claim 3, wherein the openings through which the locking pin and guide pin project have a slightly larger diameter than the pins to permit limited pivoting of the pins to prevent the pins jamming in one position.

* * * * *